Patented June 8, 1926.

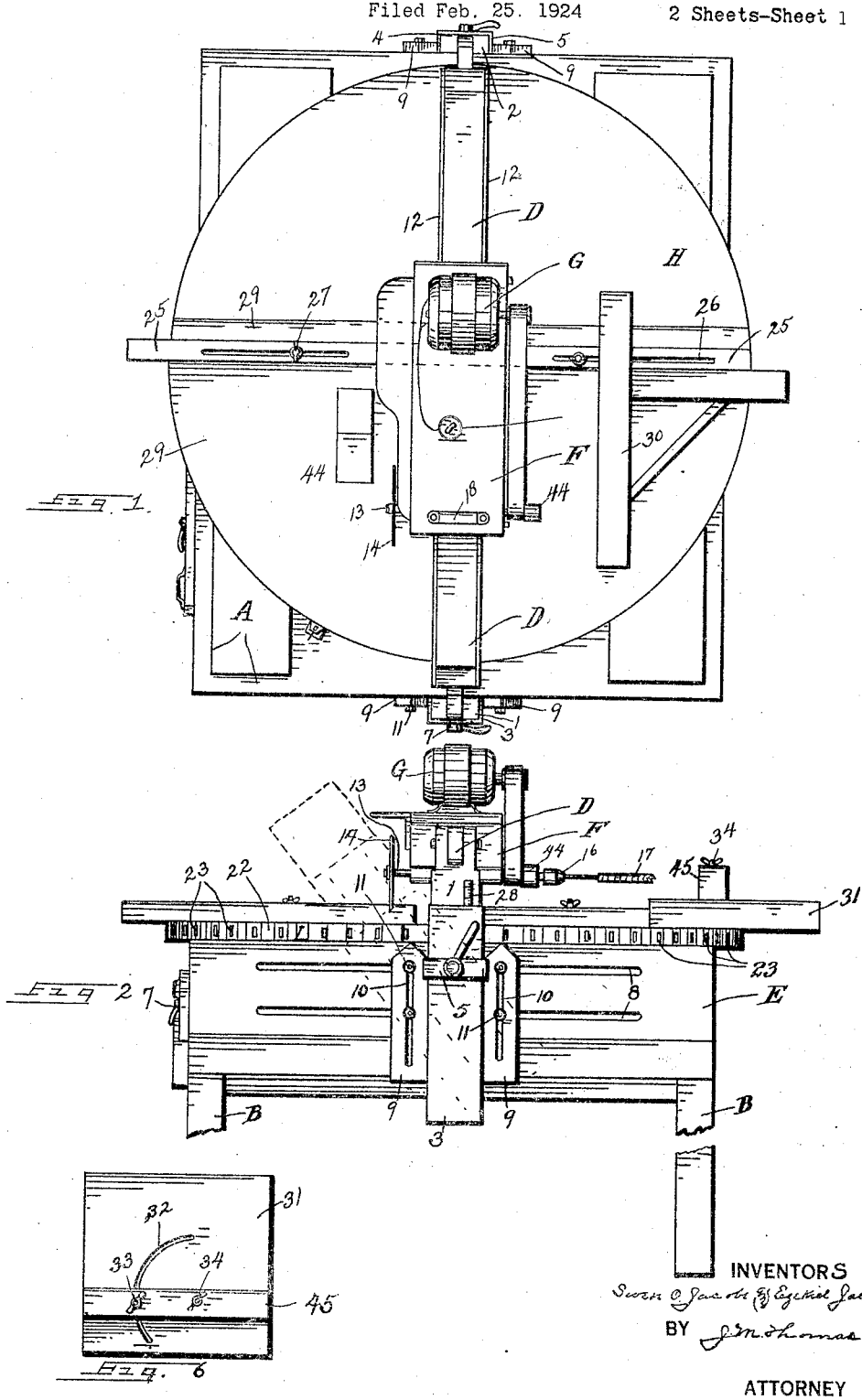

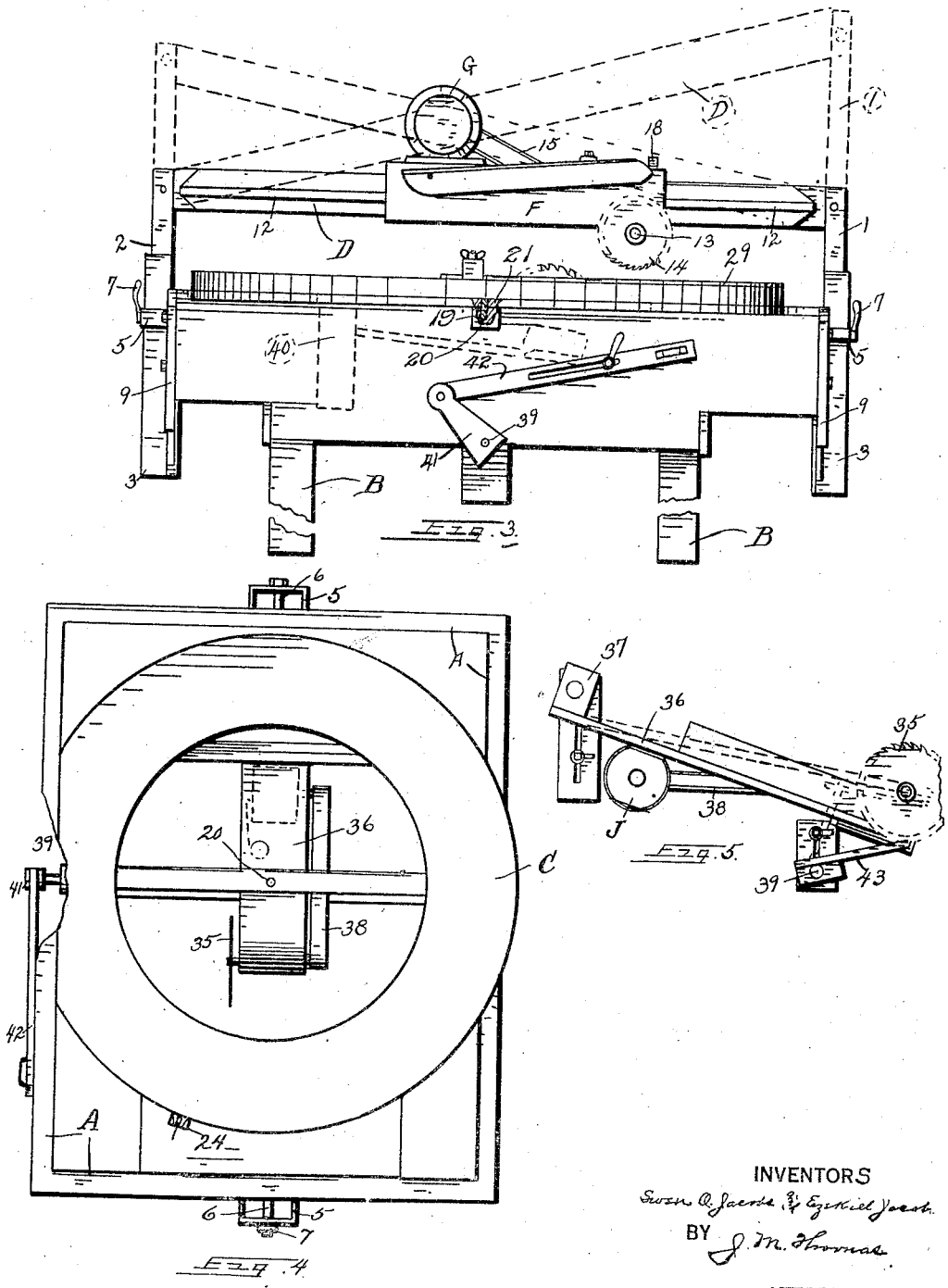

1,587,734

UNITED STATES PATENT OFFICE.

SWEN O. JACOBS AND EZEKIEL JACOBS, OF SUGAR, UTAH.

WOODWORKING MACHINE.

Application filed February 25, 1924. Serial No. 694,848.

Our invention relates to machines for working wood, and has for its object to provide an economical wood working machine which may be knocked down and moved from place to place as desired, and by which wood may be ripped and cut off at any desired angle, both horizontally and vertically, and may be polished and bored as desired.

These objects we accomplish with the machine we have invented and illustrated in the accompanying drawings in which similar letters and numerals of reference indicate like parts throughout the several views, and as described in the specification forming a part of this application and pointed out in the appended claims.

In the drawings in which we have shown the best mode of constructing and using our machines to carry out the principles of the invention, Figure 1 is a plan view of the machine, with one of the guides shown thereon. Figure 2 is the end elevation of the machine where the operator stands in using the machine, and showing in dotted lines the tool block tilted, parts cut away. Figure 3 is a side elevation of the machine showing in dotted lines the position of the cut-off saw and power element when the supporting standards are raised for the respective ends of the machine. Figure 4 is a plan view of the frame of the machine and annular top or guide within which the table top is rotated on its axis, parts cut away to show the rip saw lever. Figure 5 is a side elevation of the rip saw and its connections with the other elements of the machine. Figure 6 is a plan view of the guide for boring holes.

It is desirable to cut wood at various angles on the horizontal, as in forming miter joints, and without delay to cut at different angles on the vertical, and frequently to cut wood where both the horizontal and vertical directions are required to be at an angle, as in cutting hip rafters; also to cut mortices and recesses at an angle to the face of the material. At other places it is desired to bore holes in wood or other material and at different angles, and where the material is hard to hold in one position, and in all such uses to do the work by one operator or workman. We have invented a machine in which such work and many others may be done rapidly and accurately without extra help to hold the work in place. The machine consists of a frame A, preferably square, which is supported by legs B of any desired length. As a brace and partial top for said frame an annular member C is secured on said frame. On opposite ends of said frame are detachably and adjustably fastened the supporting standards 1 and 2. The said standards 1 and 2 are operated within their respective guide channels 3 and 4, to raise and lower the tool carrying frame, and to hold said standards 1 and 2 in the different positions required in operating the machine we provide U-shaped clamps. The said clamps 5 are held in engagement with the said standards by similar opposed U-shaped clamps on the back side of said standards, and bolts 6 with wing nuts 7 screwed thereon and which bolts are passed through elongated slots cut longitudinally in said standards. Elevation gauges 28 are secured on said standards to aid in adjusting the relative position of said standards and guide channels, A carrying frame D is pivoted or hingedly connected with the upper portion of said standards in order that either of said standards may be raised and lowered to give the direction desired in the movement of the tool carrying frame and platform in its lateral movement across the table. A slotted plate or girder E is secured on the front and rear ends of said frame A, within which are formed longitudinally disposed slots 8 which are spaced apart and parallel, and within the upper one of which the said bolt 6 is passed and operated. On each side of the said guide channels 3 are provided the retaining blocks 9, each of which is longitudinally slotted, as at 10. Within said slots 8 and 10 are passed clamp bolts 11 with nuts thereon to hold said blocks 9 in position when adjusted vertically or longitudinally as to said girders E. On the sides of said frame D are provided guide strips 12 which engage within longitudinally disposed recesses provided in the tool block F. A rectangularly-shaped opening is provided in said tool block F within which said frame D is operated, and on the upper face of said block F is mounted the motor G, and on the under side of said block F and on the end opposite the motor is mounted the main rotatable shaft 13, on one end of which is secured the circular saw 14, or any other tools which it is desired to use, such as polishing devices.

On the other end portion of said shaft 13 is secured the driving pulley 14, and the belt 15 connects said shaft 13 with the motor G. A tool chuck 16 is secured on the end of said shaft 13 adjacent said pulley 14, and in the said tool chuck 16 is detachably fastened the boring bits and tools adapted to be held by a tool chuck, such as the bit 17. A hand piece 18 is fastened on the end of said tool block F, by which the said block may be moved to and fro on the said frame D. A rotatable table top H is mounted on said frame concentric with and closely fitted within said annular member C and pivoted by a short pin 19 which bears in the hole 20. A portion of said table is extended downwardly and is circular in form, as shown at 21, to fit closely within said annular member C. The said pin and said extended portion 21 of the table top form the bearing for said table top H. The said table top is circular in form and on its perimeter is secured a band 22, having spaced recesses therein, as shown at 23, within which recesses the fastening or catch 24 for locking said table top H, when it has been rotated to the desired position relative to the cut of the saw or other tool set in or secured on said shaft 13. There are three hundred and sixty of said recesses 23, it being our intention to provide one for each degree of a circle. Diametrically across the said table top H are secured the gauge strips 25 which meet and are held in alinement by the longitudinally disposed slots 26 and bolts 27 passed through said slots and in engagement with the table top. An extra top or cover 29 is secured on and partially covering the said top H in order that the saw or other tool will not cut into and injure the said top H. The said extra top or cover may be replaced as often as required with but little expense or trouble. A right angled gauge 30 is detachably fastened on the top of said machine for use in locating the work in the desired position relative to the said saw 14. Another gauge 31 is provided for use in locating the work or material which it is desired to bore or drill, and said gauge is movable longitudinally on one of said gauge strips 25. An elongated slot 32 is cut in said gauge 31, and said slot is given an arc shape, which slot, with the bolt and wing nut thereon, allows said gauge to be moved with the other bolt and nut thereon as its axis. The respective bolts 33 and 34 engage at their heads in the slot 26 of one of said gauge strips 25. A rip saw 35 is mounted on the upper side of a carriage 36 which in turn is mounted between two of the legs B of the machine, and on the cross head 37. A motor J is mounted on the under side of said carriage 36 and a belt 38 connects said motor and the shaft of said saw 35. A rocking shaft 39 is mounted in two depending bearings 40, the upper ends of which are secured to the frame A. To one arm 41 of said rocking shaft 39 is pivoted the operating bar 42 by which said rock shaft is partially rotated. Another arm 43 of said rock shaft bears against the under side face of said carriage 36, and is the means for raising and lowering the said carriage and saw 35 upwardly into the rectangular opening 44 when it is desired to use said rip saw.

The operation of our machine is as follows:—

Power applied from the motor G to rotate the saw 14, the piece of material to be cut by the saw is held against the gauge strips 25. If the cut is to be at right angles to said piece, the table top is set at 90° by rotating the said top and engaging said catch 24 in the particular recess 23 which holds the said gauge strips at right angles to the frame D and travel of the saw when the tool block is moved backward and forward. Then, with the said standards 1 and 2 adjusted in their respective guide channels 3 and 4 to bring the frame D parallel with the top of the table, the said tool block F is moved by the operator grasping the handle 18 and shoving the said tool block F away from the standard 1. If the cut is to be at any angle across the piece, say at 45°, on the horizontal, the table top is then turned 45 spaces to the right or left and held in that position by said gauge 24 engaging in the desired recess 23. If it is desired to cut a groove in said piece inclined away from the operator, the standard 1 is raised in its guide channel 3 until the desired angle is given to the travel of the tool block F. The said standard 1 is then set by turning the wing nut 7 on the bolt 6. The operator then, by moving the tool block away from him, will cut the recess at the desired angle inclined downwardly. If it should be desired to cut said recess inclined toward him, the operator would set the said standard 1 to the bottom of the guide channel 3 and raise the standard 2 to the desired height in its guide channel 4, and the tool block carrying the saw would be moved by the operator toward himself. If the operator desired to cut the said piece at any vertical angle, the retaining blocks 9 would be turned by releasing their respective bolts 11 and the guide channels 3 and 4 would be tilted away from the vertical to the position desired in cutting said piece, as shown in dotted lines in Figure 2. The movement of the tool block and saw would be then repeated either toward or from the operator, as desired. To cut a piece for the angles desired in a jack rafter, the retaining blocks 9 would be given the tilting position to tilt the frame D, as shown in dotted lines in Figure 2, and the transverse cut would be obtained by turning the table top H to the desired angle by engaging the gauge 24 in the required recess 23 on the periphery or perimeter of said table top. Any thickness of material may be cut by raising or lowering the said standards 1 and 2. If it should be desired to bore a hole at any angle, say 45°, the gauge 31 would be secured on the gauge strip 25 and adjusted on said strip to hold the piece to be bored against the gauge block 45 on said gauge 31. The said frame D and tool block F are then tilted to the desired angle by setting the said retaining blocks 9 in the slots 8 to give the desired direction to the bit 17. Power being applied from the motor G to the shaft 13 would then bore the hole at an angle of 45°. A right angled gauge 30 may be used at any desired position on said strips 25 to measure, as well as hold, any piece of material to be cut at right angles. If it should be desired to rip material, the extra table top 29 is removed and the opening 44 in the table top exposed. Then, by moving the operating bar 42 away from the operator, the edge of the rip saw 35 would be brought above the table top H to the desired height and the material passed over said table top as guided by the gauge 30 would be ripped. We are thus able to cut or bore material at any angle on the horizontal or on the vertical planes or any combination of angles desired between those planes, either from the left or right of the vertical. A polishing block, not shown, may be secured on said shaft 13 with the face a cylinder or at any angle desired, and the tool block F moved to and fro over the table in any of the directions indicated above for operating the saws. The ordinary belt sander or polisher may be set on said table with the driving power applied through the shaft 13 to drive said belt polisher over the material which is held on the table top, directions of operation being under direct control of the operator at all times.

Having thus described our invention we desire to secure by Letters Patent and claim:—

1. A machine of the class described comprising a supported frame on which is an annular member; a table top concentrically mounted within said annular member and rotatable in either direction; a gauge strip on the edge of said table top having catch engaging recesses therein, spaced apart to represent degrees of a circle as to the circumference of the table top; adjustable standards on each end of said frame adapted to be tilted and held at any angle to the right or left of the vertical plane; a frame pivoted at each end to said standards; a tool block slidable on said frame; a shaft mounted on said tool block connected by a belt with a motor carried and mounted on said tool block; a saw on one end of said shaft and a tool chuck on the other end of said shaft; gauge strips diametrically positioned and adjustably secured on said table top.

2. A wood working machine comprising a rotatable table top, a tool block mounted above said top; a frame on which said block is movable forward and backward above said table top; means to adjust said frame in order that the movement of said tool block may be parallel with said table top, or that said movement may be inclined toward or from said table top; means to tilt said frame and thereby said tool block and hold them at any desired angle while moving said tool block to and fro on said frame; and tools adapted for use on material while the material is resting on said table top.

In testimony whereof we have affixed our signatures.

SWEN O. JACOBS.
EZEKIEL JACOBS.